Figures 1, 2, 3:
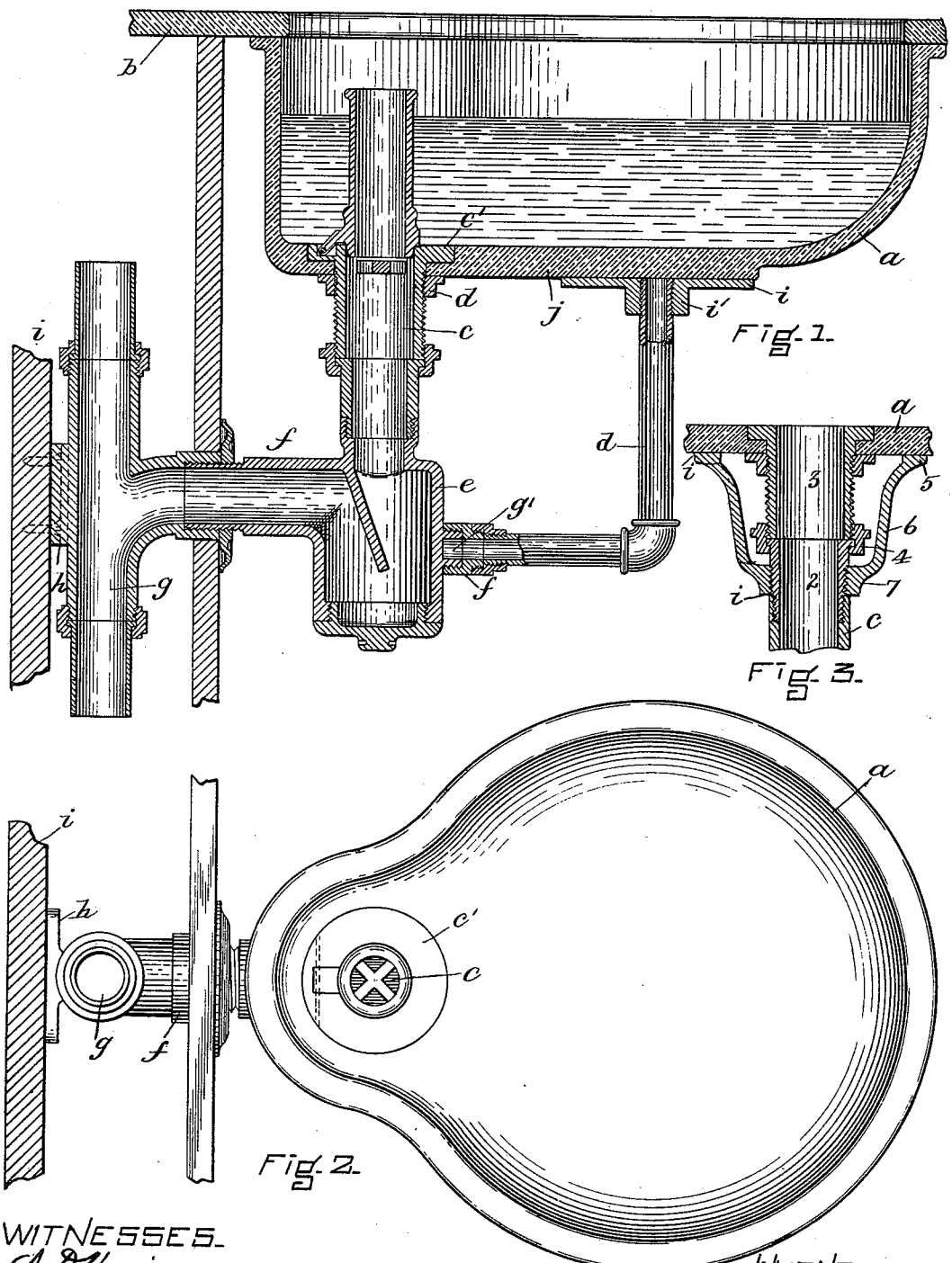

(No Model.)

J. BARRETT.
SET BOWL OR BASIN.

No. 405,818. Patented June 25, 1889.

WITNESSES
A. D. Harrison
W. C. Ramsay

INVENTOR
James Barrett

United States Patent Office.

JAMES BARRETT, OF BOSTON, MASSACHUSETTS.

SET BOWL OR BASIN.

SPECIFICATION forming part of Letters Patent No. 405,818, dated June 25, 1889.

Application filed December 17, 1888. Serial No. 293,832. (No model.)

*To all whom it may concern:*

Be it known that I, JAMES BARRETT, of Boston, in the county of Suffolk and State of Massachusetts, have invented certain new and useful Improvements in Set Bowls or Basins, of which the following is a specification.

This invention has for its object to provide simpler and less expensive means than those heretofore used for clamping the top edge of a set bowl or basin against the bottom surface of the marble slab to which the basin is affixed.

The invention consists in the improvements which I will now proceed to describe.

Of the accompanying drawings, forming a part of this specification, Figure 1 represents a vertical section of a bowl and its support embodying my invention and the slab against which the bowl is held. Fig. 2 represents a top view of the bowl, the slab being removed. Fig. 3 represents a modification.

The same letters of reference indicate the same parts in all the figures.

In the drawings, $a$ represents a set bowl or basin, and $b$ represents the marble slab, against the under side of which the margin of the bowl bears, said slab having an orifice over the bowl, as usual. The bowl here shown has an offset or recessed portion, to which the waste-pipe $c$ is attached, the waste-pipe being therefore located at one side of the center of the bowl. The waste-pipe is secured to the bowl in any suitable manner, the connection here shown being by means of a flange $c'$ on the waste-pipe fitting a recess in the bowl, and a nut $d$ screwed on the waste-pipe below the bowl and bearing against the under side of the bowl. The waste-pipe is connected with a trap $e$, on which is formed a horizontal branch or outlet pipe $f$, which is screwed into a branch on the vertical waste-pipe $g$, the latter being formed on a plate or bracket $h$, adapted to be screwed to a wall or other vertical support $i$. The trap is therefore supported by the fixed vertical pipe $g$, and partially supports the bowl by means of the described connection between the trap and bowl.

The parts thus far described are not claimed by me in this application, excepting in so far as they co-operate with the improvements presently described.

$d$ represents a brace or standard, preferably L-shaped. One end of said brace is here shown as secured to the trap $e$ by means of a tapped socket or coupling $f$ on the brace screwed upon a threaded boss or projection $g'$ on the exterior of the trap-casing. The other and upper end of the brace or standard is externally screw-threaded, and upon it is screwed a cap or nut $i$, which has a tubular internally-threaded shank $i'$, fitting the threaded upper end of the brace. Said nut has a flat upper surface, which bears upon the under side of the bowl at or near the center thereof, the bowl being provided with a flat seat $j$ to rest on said nut.

It will be seen that the nut $i$ is adjustable by its screw-connection with the standard $d$, the standard and cap constituting an adjustable support whereby the bowl may be pressed upwardly against the under side of the slab $b$. The bowl may thus be clamped so firmly against the slab that the fastening devices or clamps heretofore used to secure the flanged edge of the bowl to the slab will not be required, so that a material saving in the expense and labor of securing or setting a bowl will be effected.

This improvement is chiefly intended for use in connection with bowls which are attached to the waste-pipe at one side of the center, so that the center of gravity of the bowl is at one side of the support afforded by the waste-pipe. The improvement may be applied, however, to bowls in which the waste-pipe is at or near the center of the bowl, in which event the nut $i$ may be applied to the threaded exterior of a portion of the waste-pipe $c$, as shown in Fig. 3, said portion being a section 2, made in a separate piece from the portion 3, that is affixed to the bowl and adjustably connected to the last-named portion, so that a slight elongation of the waste-pipe may be effected to compensate for the slight upward movement of the bowl caused by the action of the nut $i$ in clamping the bowl against the slab. As shown in Fig. 3, the fixed section of the waste-pipe is connected by a union 4 with the section on which the nut is screwed. The nut is composed of a ring 5, connected by arms 6 6 with the central portion or hub 7, which is internally screw-threaded. When the nut is turned to press the bowl upwardly, the union 4 may be turned to permit the fixed section of the waste-pipe to move with the bowl. The upward movement of the bowl will of course be very slight, so that the adjustment of the union 4 will hardly be appreciable.

I claim—

1. A set bowl or basin adapted to be applied to and beneath a slab, combined with waste fixtures, substantially such as set forth, and an interposed nut bearing against the bottom of the bowl or basin and adjustable relatively thereto to force the bowl or basin into intimate contact with the slab and hold it in such position, substantially as shown and described.

2. A set bowl or basin adapted to be applied to and beneath a slab, the waste-pipe, and a trap in said waste-pipe, combined with a brace connected to said trap, and a nut arranged on the upper end of said brace and in intimate contact with the bottom of the bowl or basin and adjustable on said brace and relatively to the bowl or basin to force the bowl or basin into contact with the slab and hold it in such position, substantially as shown and described.

3. A set bowl or basin adapted to be applied to and beneath a slab, the waste-pipe, and a trap in said waste-pipe provided with a screw-threaded boss, combined with a brace coupled to said boss, and a nut arranged on the upper end of said brace and in intimate contact with the bottom of the bowl or basin and adjustable on said brace and relatively to the bowl or basin to force the bowl or basin into contact with the slab and hold it in such position, substantially as shown and described.

4. A set bowl or basin adapted to be applied to and beneath a slab and provided with a flat seat $j$ on its under side, combined with a waste-pipe, a trap therein, a brace connected to the said trap, and a nut arranged upon said brace and adjustable thereupon and fitted to or against the said flat seat of the bowl or basin to force the said bowl or basin into intimate contact with the superposed slab, substantially as shown and described.

In testimony whereof I have signed my name to this specification, in the presence of two subscribing witnesses, this 11th day of December, A. D. 1888.

JAMES BARRETT.

Witnesses:
ALEX. J. BARRETT,
C. F. BROWN.